(12) United States Patent
Xu et al.

(10) Patent No.: US 8,397,126 B2
(45) Date of Patent: Mar. 12, 2013

(54) SYSTEMS AND METHODS FOR CHANNEL CODING OF WIRELESS COMMUNICATION

(75) Inventors: Changlong Xu, Beijing (CN); Tom Harel, Shfaim (IL); Huaning Niu, Milpitas, CA (US); Jong-Kae Fwu, Sunnyvale, CA (US); Yang-Seok Choi, Portland, OR (US); Hujun Yin, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 582 days.

(21) Appl. No.: 12/655,224

(22) Filed: Dec. 24, 2009

(65) Prior Publication Data
US 2011/0004804 A1    Jan. 6, 2011

Related U.S. Application Data

(60) Provisional application No. 61/223,360, filed on Jul. 6, 2009.

(51) Int. Cl.
*H03M 13/00* (2006.01)
(52) U.S. Cl. ....................................... 714/758
(58) Field of Classification Search .................... 714/758
See application file for complete search history.

(56) References Cited

U.S. PATENT DOCUMENTS

| | | | |
|---|---|---|---|
| 6,286,105 B1 * | 9/2001 | Morley et al. | 726/4 |
| 6,829,224 B1 * | 12/2004 | Goldman et al. | 370/252 |
| 2004/0184514 A1 * | 9/2004 | Heo et al. | 375/148 |
| 2004/0223472 A1 * | 11/2004 | Sankaran et al. | 370/335 |
| 2007/0086534 A1 * | 4/2007 | Subramanyam et al. | 375/260 |
| 2008/0025433 A1 * | 1/2008 | Deguchi | 375/295 |
| 2009/0100311 A1 * | 4/2009 | Song et al. | 714/752 |
| 2010/0074350 A1 * | 3/2010 | Malladi et al. | 375/260 |
| 2010/0303004 A1 * | 12/2010 | Mueck et al. | 370/328 |

OTHER PUBLICATIONS

"Part 16: Air Interface for Broadband Wireless Access Systems", IEEE P802.16m/D1, Jul. 31, 2009, p. 241, p. 476, and pp. 483-486.

* cited by examiner

*Primary Examiner* — Scott Baderman
*Assistant Examiner* — Neil Miles
(74) *Attorney, Agent, or Firm* — Cool Patent, P.C.; Kenneth J. Cool (57) ABSTRACT

Embodiments of an apparatus and method for coding of wireless transmissions channel are generally described herein. Other embodiments may be described and claimed.

19 Claims, 4 Drawing Sheets

SYSTEMS AND METHODS FOR CHANNEL CODING OF WIRELESS COMMUNICATION

REFERENCE TO RELATED INVENTIONS

This is a non-provisional application corresponding to provisional application Ser. No. 61/223,360, filed Jul. 6, 2009, and claims the priority of that filing date for all common subject matter.

FIELD OF THE INVENTION

The field of invention relates generally to the field of wireless communications, and in particular, to the coding of a channel for wireless communication.

BACKGROUND INFORMATION

WiMAX, or WiMAX-I, is based on the IEEE (Institute of Electrical and Electronics Engineers) 802.16e standard. WiMAX-I employs orthogonal frequency division multiple access (OFDMA) for transmissions, resulting in improved multi-path performance in non-line-of-sight environments. WiMAX-I may employ single-user (SU) or multiple-user (MU) multiple-input multiple output (MIMO) antenna techniques, adaptive modulation and coding schemes, and flexible subchannelization. A new generation of WiMAX termed 802.16m is currently under development for broadband wireless access systems.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of systems and methods for coding of wireless transmissions are described herein. In the following description, numerous specific details are set forth in order to provide a thorough understanding of embodiments of the present invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Channel coding is a core process that is used to suppress and correct transmission of errors in wireless communication streams. Suppression and correction of errors transmitted in wireless streams is necessary to support reliable communication channels and high data rate connections. Channel coding is largely comprised of three functions; randomization, forward error correction (FEC), and interleaving. These functions are performed on a transmitter side and a receiver side of a wireless communication.

Randomization is a process that is used to avoid long sequences of consecutive zeros or zeros in a coded channel and may occur at one or more locations along the channel. Data coded in a channel, such as input data from a physical (PHY) layer burst, may be randomized according to a mathematical function prior to a forward error correction (FEC) process and a modulation process. The coded channel may be mapped to orthogonal frequency division multiple access (OFDMA) subchannels, wherein data from the coded channel is parsed and directed to the subchannels according to time and/or frequency allocations to provide for multiple subchannel transmission. Bits transferred along these subchannels may further be randomized to preclude interference between adjacent subcarriers and/or to reduce peak to average power ratio (PAPR) of the subcarriers. It would be useful to selectively reduce the complexity and implementation of multiple randomizers in coding processes. It would further be useful to eliminate redundancy in the application of randomizers for input data bursts in a channel and subchannel randomization for the suppression of PAPR and subcarrier interference.

Figure 1:
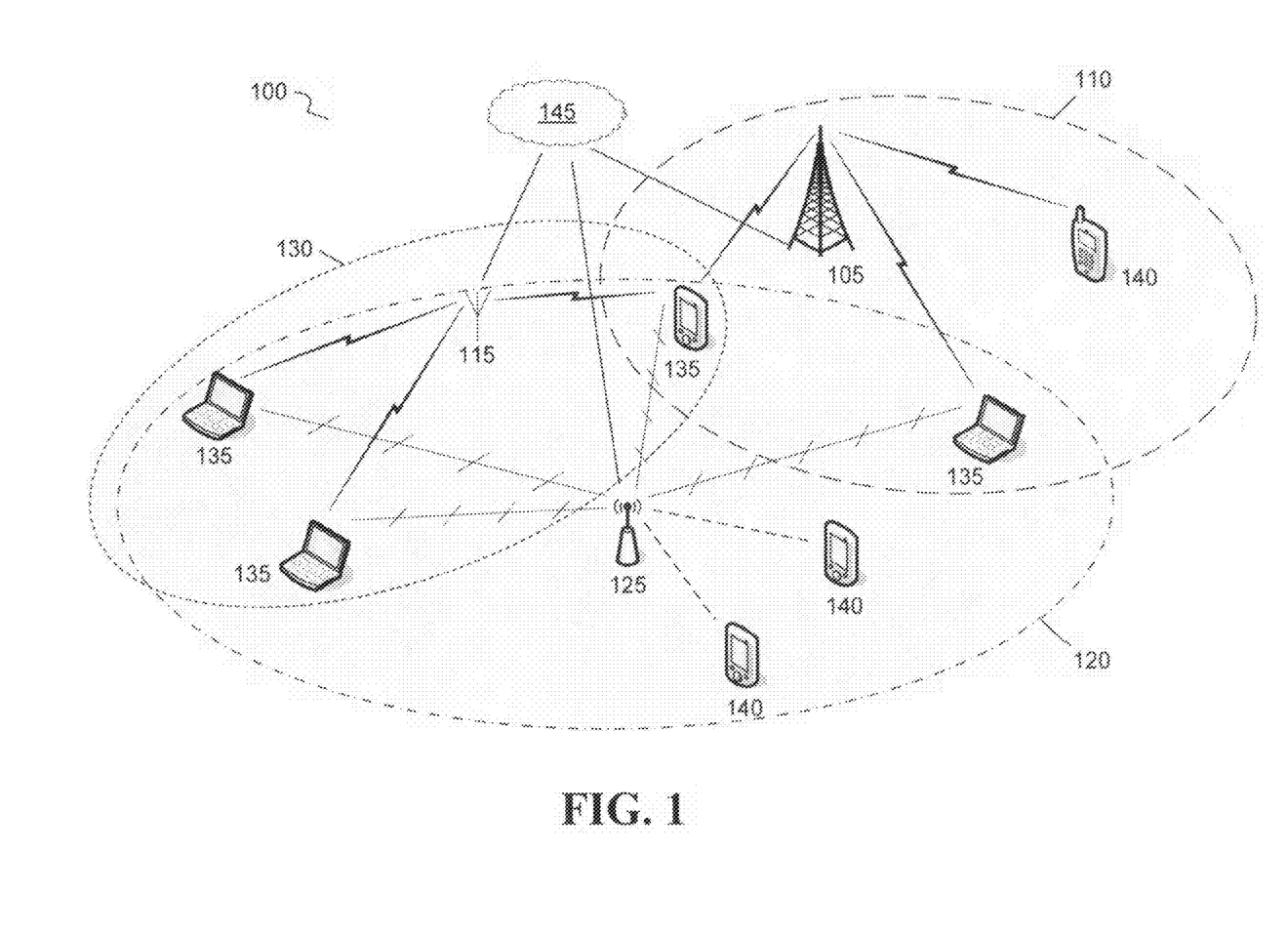
FIG. 1 illustrates wireless networks in accordance with some embodiments.

Now turning to the figures, FIG. 1 illustrates a wireless communication system 100 in accordance with some embodiments of the invention. The wireless communication system 100 may include one or more wireless networks, generally shown as 110 and 120. In particular, the wireless communication system 100 may include a wireless metropolitan area network (WMAN) 110 and a wireless local area network (WLAN) 120. Although FIG. 1 depicts two wireless networks, the wireless communication system 100 may include additional or fewer wireless communication networks. For example, the wireless communication system 100 may include one or more wireless personal area networks (WPANs) not shown, additional WLANs, and/or WMANs. The methods and apparatus described herein are not limited in this regard.

The wireless communication system 100 also includes one or more stations including subscriber stations or mobile stations generally shown as multi-radio subscriber stations 135 capable of accessing a plurality of wireless networks, and single-radio subscriber stations 140 capable of accessing a single wireless network. For example, the subscriber stations 135 and 140 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts seven subscriber stations, the wireless communication system 100 may include more or less subscriber stations 135 and 140.

The subscriber stations 135 and 140 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, orthogonal frequency-division multiple access (OFDMA), multi-carrier modulation (MDM), and/or other suitable modulation techniques to communicate via wireless links.

In an example, the subscriber stations 135 and 140 may use direct sequence spread spectrum (DSSS) modulation and/or frequency hopping spread spectrum (FHSS) modulation to implement the WLAN 120 (e.g., the 802.11 family of standards developed by the Institute of Electrical and Electronic Engineers (IEEE) and/or variations and evolutions of these standards). For example, the subscriber stations may communicate with devices associated with the WLAN 120 or an access point 125 via wireless links. The AP 125 may be operatively coupled to a router (not shown). Alternatively, the AP 125 and the router may be integrated into a single device (e.g., a wireless router).

The subscriber stations (e.g. multi-radio subscriber station 135 and a single-radio subscriber station 140) may use OFDM or OFDMA modulation to transmit large amounts of digital data by splitting a radio frequency signal into multiple small sub-signals, which in turn, are transmitted simultaneously at different frequencies. In particular, the subscriber stations may use OFDM modulation to implement the WMAN 110. For example, the multi-radio subscriber station 135 may operate in accordance with the 802.16 family of standards developed by IEEE to provide for fixed, portable, and/or mobile broadband wireless access (BWA) networks (e.g., the IEEE std. 802.16, published 2004) to communicate with the base station 105, via wireless link(s).

Although some of the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). In some embodiments, access point 125 and base station 105 may communicate in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for WLANs, although the scope of the invention is not limited in this respect as they may also be suitable to transmit and/or receive communications in accordance with other techniques and standards. In some embodiments, access point 125 and base station 105 may communicate in accordance with the IEEE 802.16-2004, IEEE 802.16(e), and the IEEE 802.16(m) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions.

The WMAN 110 and WLAN 120 may be operatively coupled to a common public or private network 145 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 120 may be operatively coupled to the common public or private network 145 via the AP 125 and/or femtocell 115. In another example, the WMAN 110 may be operatively coupled to the common public or private network 145 via the base station 105.

The wireless communication system 100 may include other suitable wireless communication networks. For example, the wireless communication system 100 may include a wireless wide area network (WWAN) (not shown). The subscriber stations may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, standards based on these technologies, variations and evolutions of these standards, and/or other suitable wireless communication standards. Although FIG. 1 depicts a WLAN 120, and a WMAN 110, the wireless communication system 100 may include other combinations of WPANs, WLANs, WMANs, and/or WWANs. The methods and apparatus described herein are not limited in this regard.

The wireless communication system 100 may further include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
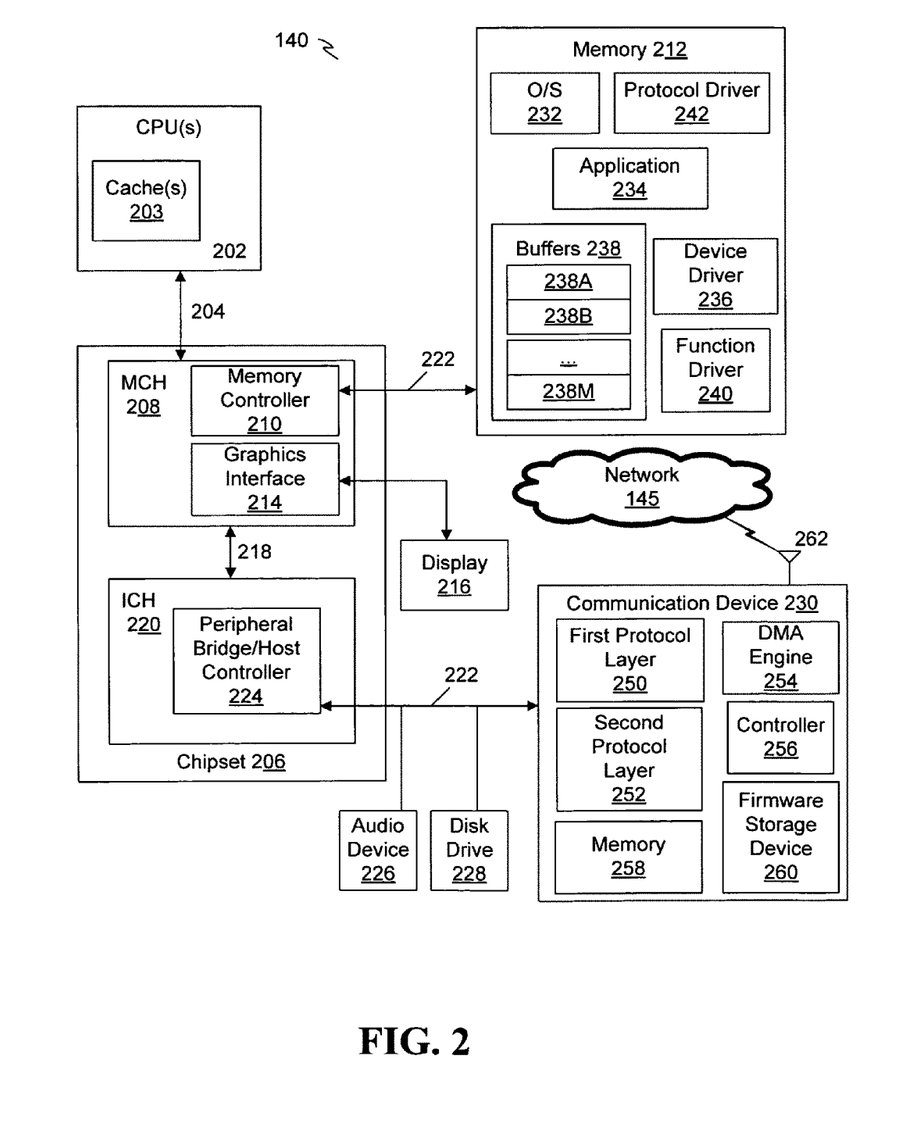
FIG. 2 illustrates a block diagram of a station in accordance with various embodiments.

FIG. 2 illustrates a block diagram of a subscriber station in accordance with various embodiments of the invention. The subscriber station 140 may include one or more host processors or central processing unit(s) (CPUs) 202 (which may be collectively referred to herein as "processors 202" or more generally "processor 202") coupled to an interconnection network or bus 204. The processors 202 may be any type of processor such as a general purpose processor, a network processor (which may process data communicated over a computer network), etc. (including a reduced instruction set computer (RISC) processor or a complex instruction set computer (CISC)). Moreover, the processors 202 may have a single or multiple core design. The processors 202 with a multiple core design may integrate different types of processor cores on the same integrated circuit (IC) die. Also, the processors 202 with a multiple core design may be implemented as symmetrical or asymmetrical multiprocessors.

The processor 202 may include one or more caches 203, which may be private and/or shared in various embodiments. Generally, a cache 203 stores data corresponding to original data stored elsewhere or computed earlier. To reduce memory access latency, once data is stored in a cache 203, future use may be made by accessing a cached copy rather than refetching or recomputing the original data. The cache 203 may be any type of cache, such a level 1 (L1) cache, a level 2 (L2) cache, a level 3 (L-3), a mid-level cache, a last level cache (LLC), etc. to store electronic data (e.g., including instructions) that is utilized by one or more components of the multi-com platform 200.

A chipset 206 may additionally be coupled to the interconnection network 204. The chipset 206 may include a memory control hub (MCH) 208. The MCH 208 may include a memory controller 210 that is coupled to a memory 212. The memory 212 may store data, e.g., including sequences of instructions that are executed by the processor 202, or any other device in communication with components of the multi-com platform 200. In various embodiments, the memory 212 includes one or more volatile storage or memory devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 204, such as multiple processors and/or multiple system memories.

The MCH 208 may further include a graphics interface 214 coupled to a display 216, e.g., via a graphics accelerator. In various embodiments, the display device 216, which, for example may include a flat panel display or a cathode ray tube, may be coupled to the graphics interface 214 through, for example, a signal converter that translates a digital representation of an image stored in a storage device such as video memory or system memory into display signals that are interpreted and displayed by the display. The display signals produced by the display device 216 may pass through various control devices before being interpreted by and subsequently displayed on the display device 216.

As shown in FIG. 2, a hub interface 218 may couple the MCH 208 to an input/output control hub (ICH) 220. The ICH 220 may provide an interface to input/output (I/O) devices coupled to the subscriber station 140. The ICH 220 may be coupled to a bus 222 through a peripheral bridge or host controller 224, such as a peripheral component interconnect (PCI) bridge, a universal serial bus (USB) controller, etc. The controller 224 may provide a data path between the processor 202 and peripheral devices. Other types of topologies may be utilized. Also, multiple buses may be coupled to the ICH 220, for example, through multiple bridges or controllers. For example, the bus 222 may comply with the Universal Serial Bus Specification, Revision 1.1, Sep. 23, 1998, and/or Universal Serial Bus Specification, Revision 2.0, Apr. 27, 2000 (including subsequent amendments to either revision). Alternatively, the bus 222 may comprise other types and configurations of bus systems. Moreover, other peripherals coupled to the ICH 220 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 222 may be coupled to an audio device 226, one or more rotating or solid state disk drive(s) 228, and a communication device 230, which in various embodiments may be a network interface card (NIC) or a tuner card. Other devices may be coupled to the bus 222. Also, various components such as the communication device 230 may be coupled to the MCH 208 in various embodiments. In addition, the processor 202 and the MCH 208 may be combined to form a single chip.

Additionally, the subscriber station 140 may include volatile and/or nonvolatile memory or storage. For example, nonvolatile memory may include one or more of the following: read-only memory (ROM), programmable ROM (PROM), erasable PROM (EPROM), electrically EPROM (EEPROM), a disk drive or solid state drive (e.g., 228), a floppy disk, a compact disk ROM (CD-ROM), a digital versatile disk (DVD), flash memory, a magneto-optical disk, or other types of nonvolatile machine-readable media capable of storing electronic data including instructions.

The memory 212 may include one or more of the following in various embodiments: an operating system (O/S) 232, application 234, device driver 236, buffers 238, function driver 240, and/or protocol driver 242. Programs and/or data stored in the memory 212 may be swapped into the solid state drive 228 as part of memory management operations. The processor(s) 302 executes various commands and processes one or more packets with one or more computing devices coupled to the network 145 over a radio 262. In various embodiments, a packet may be a sequence of one or more symbols and/or values that may be encoded by one or more electrical signals transmitted from at least one sender to at least one receiver. For example, each packet may have a header that includes information that may be utilized in routing and/or processing of the packet may comprise the continuity counter, a sync byte, source address, a destination address, packet type, etc. Each packet may also have a payload that includes the raw data or content the packet is transferring between various stations.

In various embodiments, the application 234 may utilize the O/S 232 to communicate with various components of the subscriber station 140, e.g., through the device driver 236 and/or function driver 240. For example, the device driver 236 and function driver 240 may be used for different categories, e.g., device driver 236 may manage generic device class attributes, whereas the function driver 240 may manage device specific attributes (such as USB specific commands). In various embodiments, the device driver 236 may allocate one or more buffers to store packet data.

As illustrated in FIG. 2, the communication device 230 includes a first network protocol layer 250 and a second network protocol layer 252 for implementing the physical (PHY) layer to send and receive network packets to and from the base station 105, the femtocell station 115, the access point 125, and/or other subscriber stations (e.g. multi-radio subscriber station 135, single-radio mobile station 140) over the radio 262. The radio 262 may comprise one or more antennas. The PHY layer is generally responsible for transmission of bit sequences while defining a type of signal used, a kind of modulation and demodulation, and transmission power used to transmit the bit sequences.

The communication device 230 may further include a direct memory access (DMA) engine 254, which may write packet data to buffers 238 to transmit and/or receive data. Additionally, the communication device 230 may include a controller 256, which may include logic, such as a programmable processor for example, to perform communication device related operations. In various embodiments, the controller 256 may be a MAC (media access control) component. The communication device 230 may further include a memory 258, such as any type of volatile/nonvolatile memory (e.g., including one or more cache(s) and/or other memory types discussed with reference to memory 212).

In various embodiments, the communication device 230 may include a firmware storage device 260 to store firmware (or software) that may be utilized in management of various functions performed by components of the communication device 230. The storage device 260 may be any type of a storage device such as a non-volatile storage device. For example, the storage device 260 may include one or more of the following: ROM, PROM, EPROM, EEPROM, disk drive, floppy disk, CD-ROM, DVD, flash memory, a magneto-optical disk, or other types of nonvolatile machine-readable media capable of storing electronic data, including instructions.

In various embodiments, bus 222 may comprise a USB bus. Isochronous mode is one of the four data flow types for USB devices (the others being Control Interrupt and Bulk). Isochronous mode is commonly used for streaming multimedia data types such as video or audio sources. In isochronous mode, a device can reserve bandwidth on the bus making isochronous mode desirable for multimedia applications.

Figure 3:
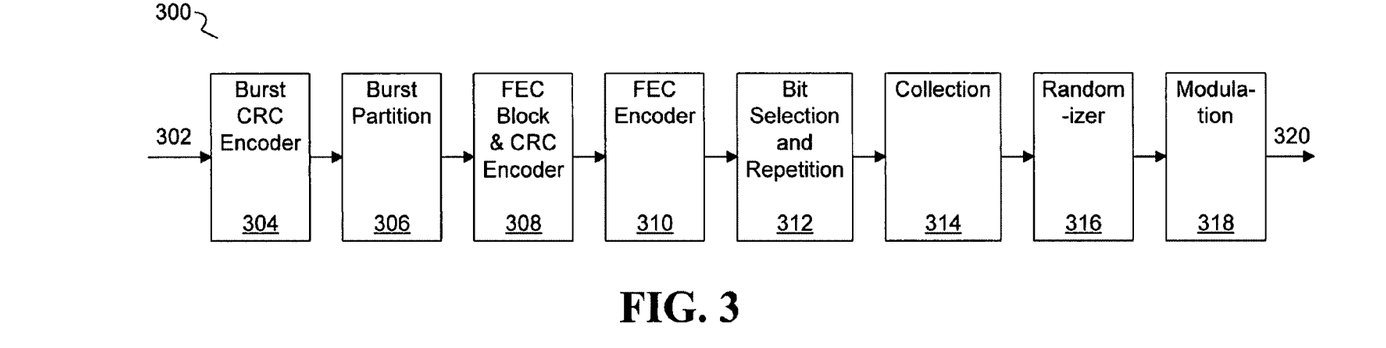
FIG. 3 is a block diagram of channel coding according to embodiments of the invention.

FIG. 3 is a block diagram of a channel coding flow 300 according to embodiments of the invention. The channel coding flow 300 may be used to suppress and correct transmission of errors to enable reliable communications and high data rate connections. A burst comprising a packet of bits is received in encoder input 302, wherein the burst may be an input data burst from a physical (PHY) layer of a communication device such as a subscriber station 140, an access point 125, or a base station 105. The input data burst from the PHY layer may be referred to as a PHY burst.

A cyclic redundancy code (CRC) in the form of CRC bits may be appended to the burst by a burst CRC encoder 304. The CRC are used to detect errors in packets received at the encoder input 302. The CRC and the burst is partitioned by a burst partition 306 element wherein a size of each partition may include parity bits of the CRC. The partitions are allocated to one or more forward error correction (FEC) blocks using a FEC block and CRC encoder 308 element. As illustrated in this embodiment, a CRC is added to the burst and is partitioned into FEC blocks without randomization. Each FEC block is encoded by a FEC encoder 310 element using, for example, a convolutional turbo code. Selected bits are formed for each FEC block using a bit selection and repetition 312 element for the generation of subpackets. The selected bits are then collected from each FEC block using a collection element 314, wherein the selected bits may be collected from each sequential FEC block.

The burst is randomized using a randomizer 316 in FIG. 3 for uplink and downlink data channels and control channels. The randomizer 316 may be a pseudo-random binary sequence (PRBS) generator 400 as described in FIG. 4. In one embodiment, the PRBS generator 400 comprises a polynomial equation of $1+x^{18}+x^{23}$ and an initial vector for the PRBS is initialized for every burst. Application of the randomizer 316 in this embodiment is useful because it reduces complexity in the coding channel by eliminating multiple randomization processes. Further, application of the randomizer 316 prior to a modulation 318 element wherein the burst is modulated to provide a modulated channel output 320 prior to forming subcarriers in subchannels without providing randomization in any of the subcarrier channels after said modulating.

Figure 4:
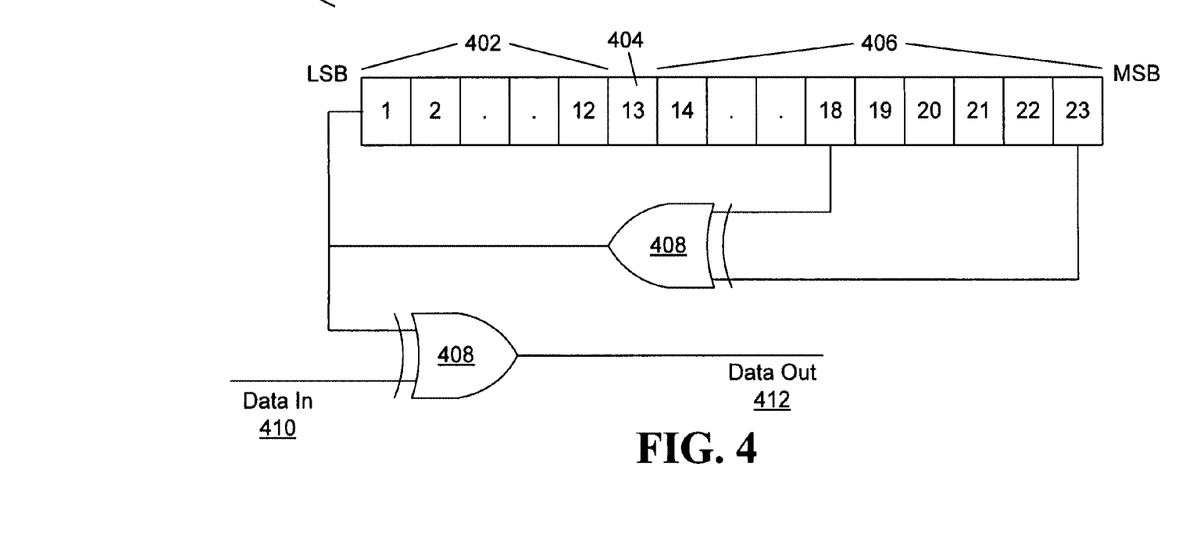
FIG. 4 is a block diagram of a pseudo-random binary sequence (PRBS) generator according to embodiments of the invention.
Figure 5:
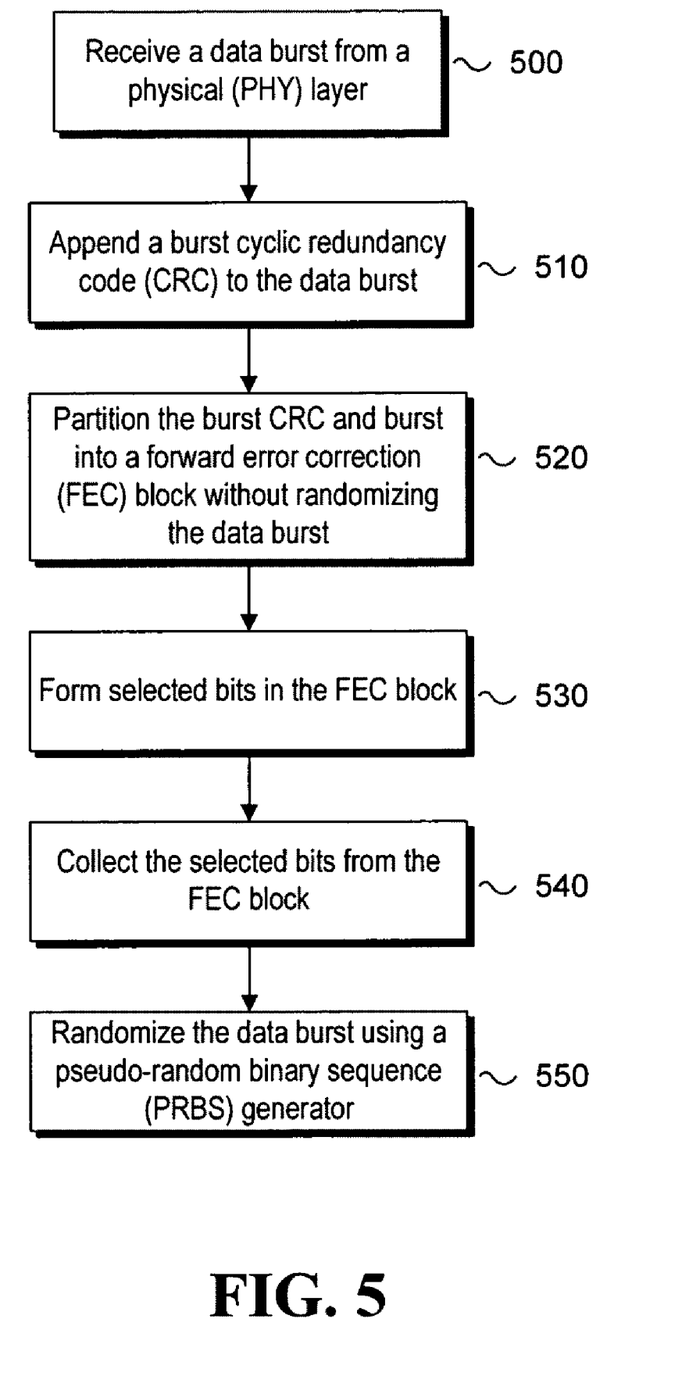
FIG. 5 is a flow diagram of channel coding randomization according to embodiments of the invention.

FIG. 4 is a block diagram of a pseudo-random binary sequence (PRBS) generator 400 according to embodiments of the invention. The PRBS generator 400 may be the randomizer 316 as illustrated in FIG. 3 or used in an alternate location or locations of a channel coding and/or sub-channel coding process. The PRBS generator 400 comprises a register of the PRBS generator that is 23 bits in length with 12 station identifier bits 402 which may closely align with a least significant bit (LSB) of the register, and an initial state bit followed by 10 bits for an integer value of a cell ID (IDcell) 406 which more closely align with a most significant bit (MSB) of the register. Exclusive OR gates 408 are used to allocate transfer of bits between the data in 410 and the data out 412 flows wherein the data in 410 represents burst from the collection 314 element and the data out 412 is directed to the modulation 318 element in this embodiment.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

Thus, embodiments of this invention may be used as or to support a software program executed upon some form of processing core (such as a processor of a computer) or otherwise implemented or realized upon or within a machine-readable medium. A machine-readable medium includes any mechanism for storing information in a form readable by a machine (e.g., a computer). For example, a machine-readable medium can include such as a read only memory (ROM); a random access memory (RAM); a magnetic disk storage media; an optical storage media; and a flash memory device, etc.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A coding method, comprising:
  receiving a data burst from a physical (PHY) layer of a communication device;
  appending a cyclic redundancy code (CRC) to the data burst;
  partitioning the CRC and data burst into a forward error correction (FEC) block without randomizing the data burst;
  forming selected bits in the FEC block;
  collecting the selected bits from the FEC block; and
  randomizing the data burst using a pseudo-random binary sequence (PRBS) generator after said forming, wherein the data burst is unmodulated prior to said randomizing.

2. The method of claim 1, further including modulating the data burst after randomizing the data burst.

3. The method of claim 1, wherein the PRBS generator comprises a polynomial equation of $1+x^{18}+x^{23}$.

4. The method of claim 3, wherein an initial vector for the PRBS is initialized for every data burst.

5. The method of claim 4, wherein the initial vector comprises 23 bits and a first 12 bits of the 23 bits represent station identifiers (STID).

6. The method of claim 1, wherein a register of the PRBS generator is 23 bits in length.

7. A method for randomization of a physical (PHY) layer burst in a coding channel comprising receiving a PHY burst, erroe correction encoding the PHY burst, initializing a vector for a pseudo-random binary sequence (PRBS) generator for the PHY burst, randomizing the PHY burst using the PRBS generator after said error correction encoding, modulating the PHY burst, and forming subcarrier channels without providing randomization in any of the subcarrier channels after said modulating, wherein the PHY burst is unmodulated prior to said randomizing.

8. The method of claim 7, wherein the PRBS generator comprises a polynomial equation of $1+x^{18}+x^{23}$.

9. The method of claim 8, further comprising appending a cyclic redundancy code (CRC) to the PHY burst and partitioning the CRC and PHY burst into a forward error correction (FEC) block without randomizing the PHY burst.

10. The method of claim 9, wherein the vector comprises 23 bits and a first 12 bits of the 23 bits represent station identifiers (STID).

11. The method of claim 10, wherein an initial state bit follows the first 12 bits and 10 bits for an integer value of a cell ID (IDcell) follow the initial state bit.

12. The method of claim 7, wherein a register of the PRBS generator is 23 bits in length.

13. A device for channel coding in a wireless network comprising:
   an antenna;
   a memory module; and
   a processor coupled to the memory module for executing a set of instructions stored in the memory module, the set of instructions for randomizing a physical (PHY) layer burst in a coding channel by receiving a PHY burst, erroe correction encoding the PHY burst, initializing a vector for a pseudo-random binary sequence (PRBS) generator for the PHY burst, randomizing the PHY burst using the PRBS generator after said erroe correction encoding, modulating the PHY burst, and forming subcarrier channels without providing randomization in any of the subcarrier channels after said modulating, wherein the PHY burst is unmodulated prior to said randomizing.

14. The device of claim 13, further including a communication device coupled to the antenna to communicate over an IEEE 802.16(m) communications protocol.

15. The device of claim 13, wherein the PRBS generator comprises a polynomial equation of $1+x^{18}+x^{23}$.

16. The device of claim 13, further comprising appending a cyclic redundancy code (CRC) to the PHY burst and partitioning the CRC and PHY burst into a forward error correction (FEC) block without randomizing the PHY burst.

17. The device of claim 13, wherein the vector comprises 23 bits and a first 12 bits of the 23 bits represent station identifiers (STID).

18. The device of claim 17, wherein an initial state bit follows the first 12 bits and 10 bits for an integer value of a cell ID (IDcell) follow the initial state bit.

19. The device of claim 13, wherein a register of the PRBS generator is 23 bits in length.

* * * * *

UNITED STATES PATENT AND TRADEMARK OFFICE
CERTIFICATE OF CORRECTION

PATENT NO.         : 8,397,126 B2
APPLICATION NO.    : 12/655224
DATED              : March 12, 2013
INVENTOR(S)        : Changlong Xu et al.

It is certified that error appears in the above-identified patent and that said Letters Patent is hereby corrected as shown below:

On the Title page, in item (75), in column 1, in "Inventors", line 2, delete "Shfaim" and insert -- Shefayim --, therefor.

In the claims

In column 8, line 65, in claim 7, delete "erroe" and insert -- error --, therefor.

In column 10, line 4, in claim 13, delete "erroe" and insert -- error --, therefor.

Signed and Sealed this
Eleventh Day of June, 2013

Teresa Stanek Rea
*Acting Director of the United States Patent and Trademark Office*